US009374841B2

(12) United States Patent
Chang et al.

(10) Patent No.: US 9,374,841 B2
(45) Date of Patent: Jun. 21, 2016

(54) COMMUNICATIVE CONNECTION METHOD AMONG MULTIPLE DEVICES

(71) Applicant: HTC Corporation, Taoyuan County (TW)

(72) Inventors: Edward Chang, Taoyuan County (TW); Tung-Peng Wu, Taoyuan County (TW); Chung-Huan Mei, Taoyuan County (TW); Te-Chuan Liu, Taoyuan County (TW); Feng-Yi Chu, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 108 days.

(21) Appl. No.: 13/947,124

(22) Filed: Jul. 22, 2013

(65) Prior Publication Data
US 2015/0024678 A1 Jan. 22, 2015

(51) Int. Cl.
H04B 7/00 (2006.01)
H04B 17/00 (2015.01)
H04M 1/66 (2006.01)
H04W 24/00 (2009.01)
H04W 76/02 (2009.01)
H04W 4/08 (2009.01)
H04L 12/18 (2006.01)
G06F 21/44 (2013.01)
H04W 12/04 (2009.01)
H04W 4/02 (2009.01)
H04W 4/20 (2009.01)
(Continued)

(52) U.S. Cl.
CPC ........... *H04W 76/023* (2013.01); *G06F 21/445* (2013.01); *H04L 12/18* (2013.01); *H04L 12/1845* (2013.01); *H04W 4/08* (2013.01); *H04W 12/04* (2013.01); *H04L 12/189* (2013.01); *H04W 4/027* (2013.01); *H04W 4/206* (2013.01); *H04W 8/005* (2013.01); *H04W 84/12* (2013.01)

(58) Field of Classification Search
CPC ...... H04W 4/08; H04W 76/025; H04W 84/20
USPC ........... 455/67.11, 456.6, 457, 507, 517–519, 455/41.2–41.3
See application file for complete search history.

(56) References Cited

U.S. PATENT DOCUMENTS 8,284,748 B2 * 10/2012 Borghei ......................... 370/338
8,312,392 B2 * 11/2012 Forutanpour et al. .......... 715/863
8,630,681 B2 * 1/2014 Kim ............................ 455/556.1
(Continued)

FOREIGN PATENT DOCUMENTS

CN   1836403 A      9/2006
CN   102273184 A   12/2011
CN   101401057 B    3/2012

OTHER PUBLICATIONS

Corresponding Taiwanese Office Action that these art references were cited.

Primary Examiner — Simon Nguyen
(74) Attorney, Agent, or Firm — CKC & Partners Co., Ltd.

(57) ABSTRACT

A communicative connection method among multiple devices is disclosed herein. The communicative connection method includes steps of: sensing a motion pattern on each of the devices; broadcasting the motion pattern on each of the devices; comparing the motion patterns from the devices; and, forming a first wireless communicative connection among a group of at least two devices sharing one common motion pattern.

17 Claims, 7 Drawing Sheets

(51) Int. Cl.
*H04W 8/00* (2009.01)
*H04W 84/12* (2009.01)

(56) References Cited

U.S. PATENT DOCUMENTS

| | | | | |
|---|---|---|---|---|
| 8,676,123 | B1* | 3/2014 | Hinkle | 455/41.2 |
| 8,849,200 | B2* | 9/2014 | Svensson et al. | 455/41.2 |
| 8,897,704 | B1* | 11/2014 | Kahn et al. | 455/41.2 |
| 2004/0123106 | A1* | 6/2004 | D'Angelo et al. | 713/171 |
| 2009/0031258 | A1* | 1/2009 | Arrasvuori et al. | 715/863 |
| 2009/0140986 | A1* | 6/2009 | Karkkainen et al. | 345/173 |
| 2009/0221275 | A1* | 9/2009 | Trip | 455/418 |
| 2010/0278345 | A1* | 11/2010 | Alsina et al. | 380/283 |
| 2011/0034125 | A1* | 2/2011 | Preston et al. | 455/41.2 |
| 2013/0078923 | A1* | 3/2013 | Ekbatani et al. | 455/41.2 |
| 2013/0165098 | A1* | 6/2013 | Nakazawa et al. | 455/418 |
| 2013/0189925 | A1* | 7/2013 | Staskawicz et al. | 455/41.1 |
| 2013/0227055 | A1* | 8/2013 | Vasseur | H04L 41/145 709/217 |
| 2013/0322461 | A1* | 12/2013 | Poulsen | 370/458 |
| 2014/0006954 | A1* | 1/2014 | Raffa et al. | 715/733 |
| 2014/0162601 | A1* | 6/2014 | Kim et al. | 455/411 |
| 2014/0273849 | A1* | 9/2014 | Lee et al. | 455/41.2 |
| 2014/0342670 | A1* | 11/2014 | Kang | H04W 24/08 455/41.2 |
| 2014/0365979 | A1* | 12/2014 | Yoon et al. | 715/863 |
| 2015/0111500 | A1* | 4/2015 | Koh et al. | 455/41.2 |

* cited by examiner

US 9,374,841 B2

COMMUNICATIVE CONNECTION METHOD AMONG MULTIPLE DEVICES

BACKGROUND

1. Field of Invention

The present application relates to controlling method among multiple devices. More particularly, the present application relates to controlling method for establishing a communicative connection and performing related applications among devices.

2. Description of Related Art

Recently, portable communication devices become common belongings to everyone in modern society. For example, mobile phones, personal digital assistants, smart phones and tablet computers are widespread in various applications. Portable communication devices are widespread because the devices have high portability and are capable of performing various functions, such as internet surfing, multimedia message transmitting, data/information exchanging, document editing, photo shooting and paper reading. The function of data/information exchanging (including file sharing, data transmission, etc) is popular one among aforesaid functions.

In a conventional practice, different communication devices may exchange information between each others by a cellular network (e.g., a mobile network based on a protocol of GSM, CDMA or WCDMA). However, the transmission over the cellular network lacks of efficiency because of slow transmission speed or high transmission cost.

On the other hand, different communication devices may also exchange information between each others via an intermediate device, such as an access point of local area network (LAN). However, the communication devices must connect to the same intermediate device before exchanging information.

In another conventional practice, different communication devices located within a certain distance may directly exchange information between each others by a peer-to-peer (P2P) network.

However, when there are many users gathering within the same space in a social occasion (e.g., holding a meeting or doing a presentation) and these users are trying to exchange files for different purposes with different persons, it is hard to establish correct connections between many devices. A user may accidentally transfer a classified file (or a sensitive data) to a wrong person. The securities of these transmissions are hard to maintain.

SUMMARY

An aspect of the present application is to provide a communicative connection method among multiple devices. The communicative connection method includes steps of: sensing a motion pattern on each of the devices; broadcasting the motion pattern on each of the devices; comparing the motion patterns from the devices; and, forming a first wireless communicative connection among a group of at least two devices sharing one common motion pattern.

Another aspect of the present application is to provide a communicative connection method suitable for a first device among other devices. The communicative connection method includes steps of: sensing a motion pattern of the first device; broadcasting the motion pattern of the first device; searching if there is a second device of the other devices around the first device; comparing another motion pattern from the second device with the motion pattern of the first device if the second device is found around the first device; and, forming a first wireless communicative connection between the first device and the second device if the motion patterns are matched.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
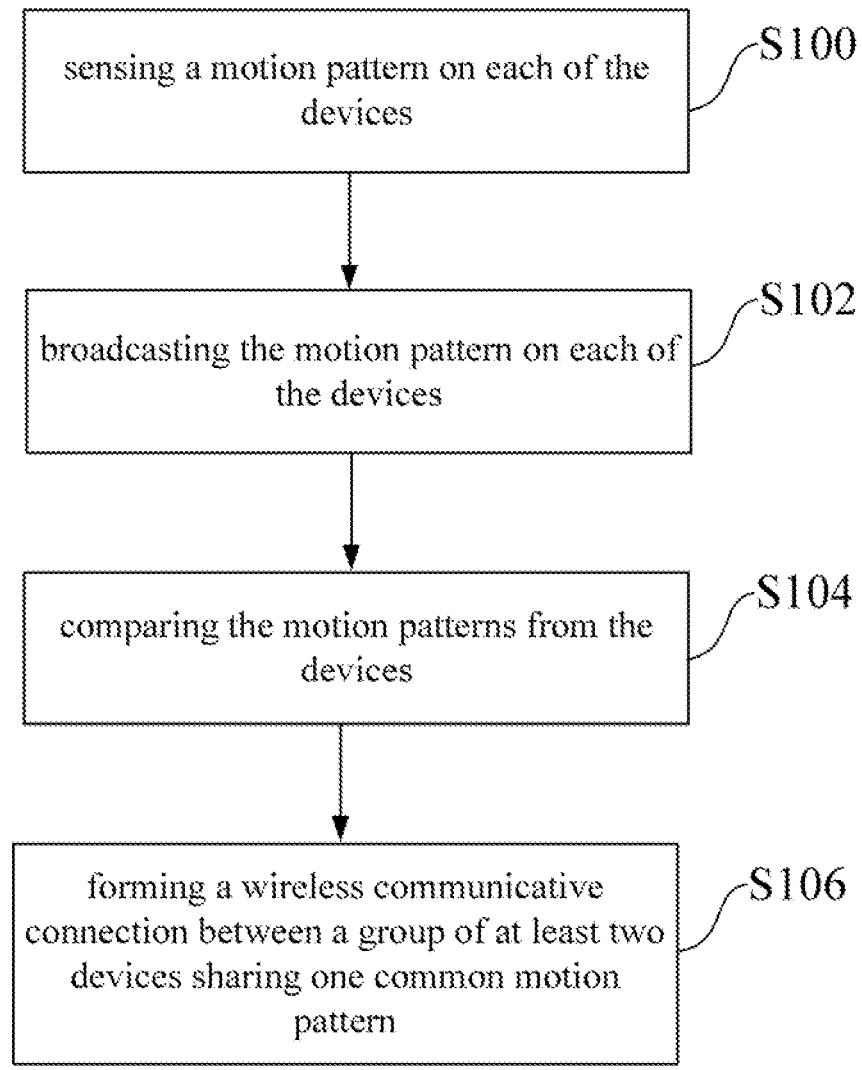
FIG. 1 is a flow chart illustrating a communicative connection method among devices according to an embodiment of the disclosure.
Figure 2A:
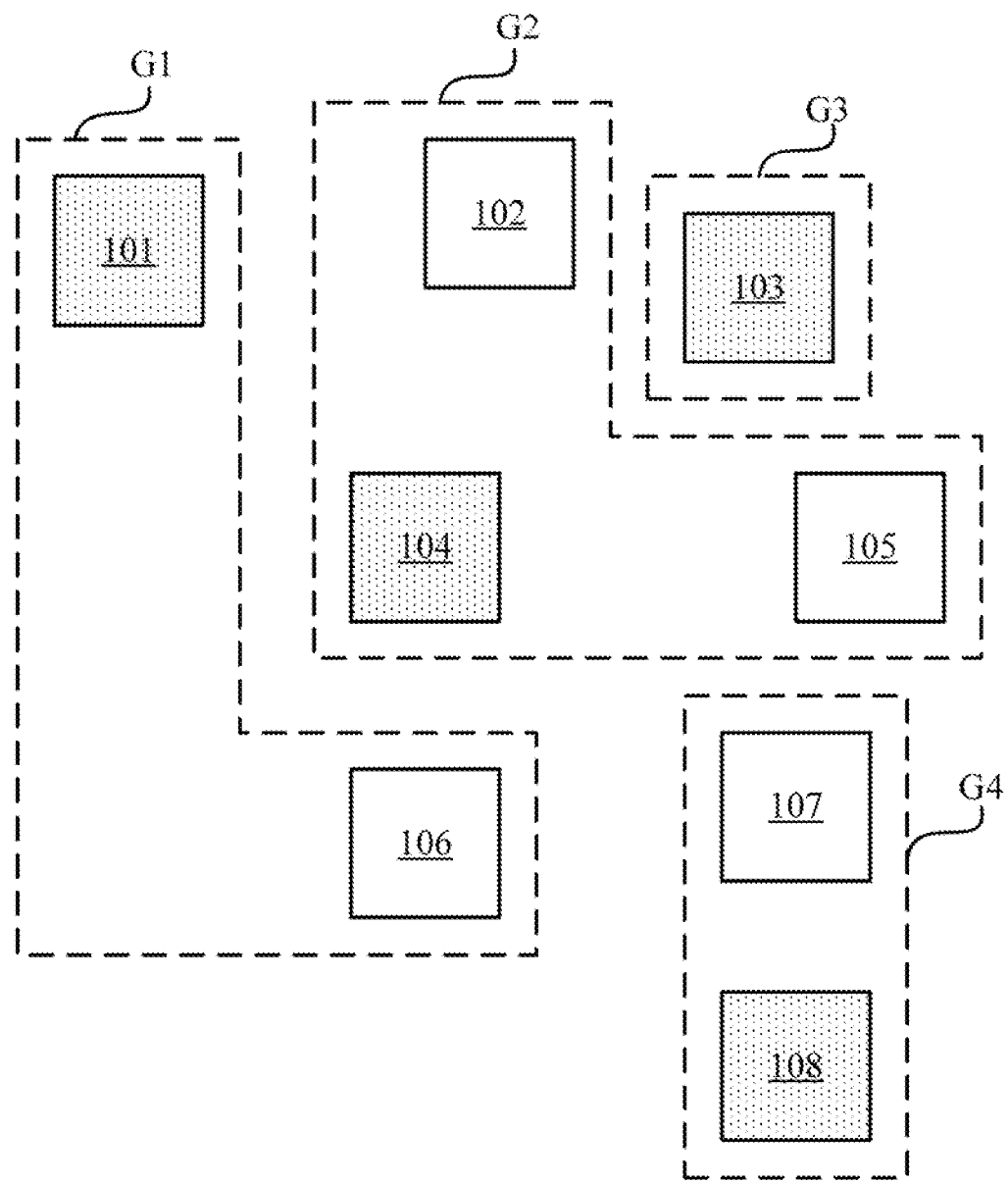
FIG. 2A is a schematic diagram illustrating a connective relationship among devices according to an embodiment of the disclosure.
Figure 3:
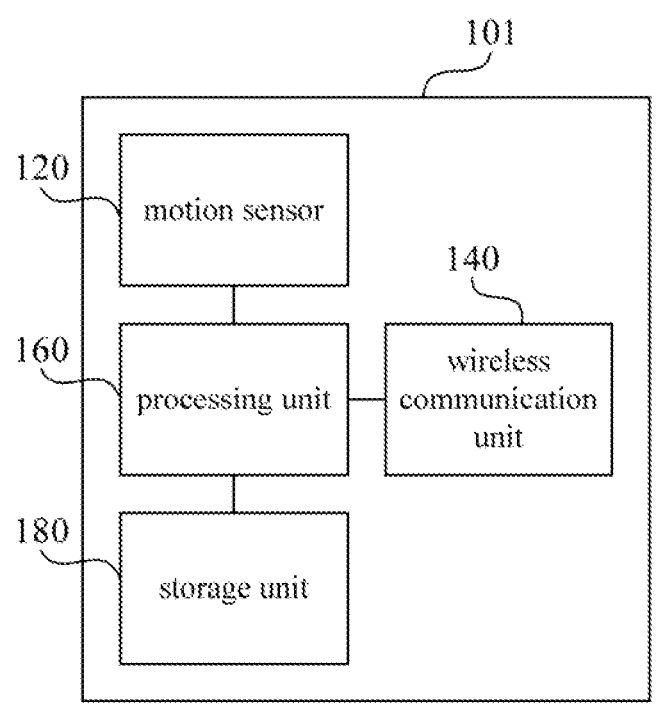
FIG. 3 is a functional diagram illustrating the device according to an embodiment of the disclosure.

Reference is made to FIG. 1, FIG. 2A and FIG. 3. FIG. 1 is a flow chart illustrating a communicative connection method among devices according to an embodiment of the disclosure. FIG. 2A is a schematic diagram illustrating a connective relationship among devices 101~108 according to an embodiment of the disclosure. FIG. 3 is a functional diagram illustrating the device 101 according to an embodiment of the disclosure.

Figure 2B:
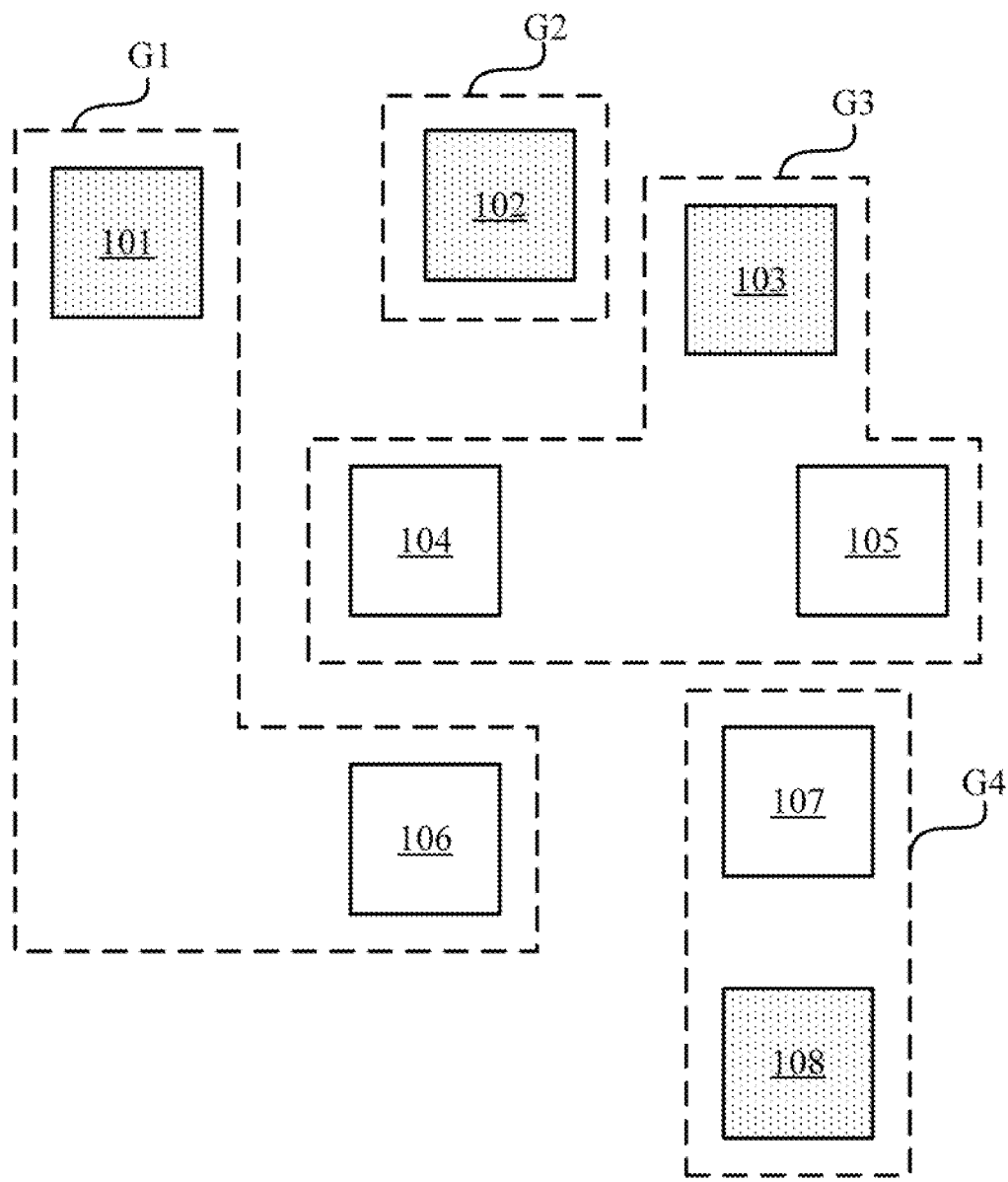
FIG. 2B is a schematic diagram illustrating another connective relationship among devices according to the embodiment of the disclosure.

The communicative connection method among devices of this disclosure can be configured for establishing communicative connections in different groups of devices. As shown in FIGS. 2A and 2B, there are eight devices 101~108 located near by each others in the same space. For example, the devices 101~108 can be located in the same area, such as a meeting room, a bus stop, a plaza, a station, a building, etc.

As shown in FIG. 3, each of the devices (the device 101 is illustrated for example in FIG. 3) may include a motion sensor 120, a wireless communication unit 140, a processing unit 160 and a storage unit 180. In present invention, the device 101 of FIG. 3 may be an electronic device such as mobile phones, personal digital assistants, smart phones, wearable devices and tablet computers.

The wireless communication unit 140 is configured for forming a wireless communicative connection. The storage unit 180 is configured for storing data (e.g., files, multimedia contents, contact information, authentication information, etc) of the device.

As shown in FIG. 1, step S100 of the communicative connection method is executed for sensing a motion pattern on each of the devices. Each of the devices 101~108 may sense the motion pattern by the motion sensor 120 on their own device. The motion sensor 120 may include a gravity sensor (G-sensor), compass sensor, a gyroscope sensor (Gyro sensor) or a combination thereof.

In an example shown in FIG. 2A, the devices 101 and 106 are moved in an "8"-shaped pattern; the devices 102, 104 and 105 are moved like "5"-shaped pattern; the device 103 is moved in a "2"-shaped pattern; and the devices 107 and 108 are moved in a "3"-shaped pattern. However, the motion patterns are not limited to a shape of number. Any letter, character or symbol can be used as a motion pattern in this disclosure.

In aforesaid example, the motion patterns on the devices are converted into distinct motion codes representing different motion patterns. The operation of converting motion patterns into motion codes (e.g. string) can be realized, but not limited to, by checking a pre-defined look-up table stored in device. For example, the "8"-shaped pattern can be converted into a string "AB01"; the "5"-shaped pattern can be converted into a string "AC03"; the "2"-shaped pattern can be converted into another string "C01A"; and the "3"-shaped pattern can be converted into another string "03BC". However, the disclosure is not limited thereto. In another embodiment, the motion pattern can be broadcasted by raw data of the motion sensor 120.

Step S102 is executed for broadcasting the motion pattern (or the corresponding motion code) on each of the devices 101~108. Afterward, step S104 is executed for comparing the motion patterns (or the corresponding motion code) from the devices 101~108.

In aforesaid example shown in FIG. 2A, the devices 101 and 106 sharing one common motion pattern (i.e., "8"-shaped pattern) are matched in S104 and classified as a group G1. The devices 102, 104 and 105 sharing one common motion pattern (i.e., "5"-shaped pattern) are matched in S104 and classified as a group G2. The devices 107 and 108 sharing one common motion pattern (i.e., "3"-shaped pattern) are matched in S104 and classified as a group G4. In this case, the devices moving in the same pattern can be classified in the same group. On the other hand, the device 103 with an individual pattern may also form a group G3 in the example.

Step S106 is executed for forming a wireless communicative connection among a group of at least two devices sharing one common motion pattern. In aforesaid example shown in FIG. 2A, a wireless communicative connection is formed between the devices 101 and 106 in the group G1; another wireless communicative connection is formed between devices 102, 104 and 105 in the group G2; and, another wireless communicative connection is formed between devices 107 and 108 in the group G4. In this embodiment, the wireless communicative connection among the group G1, the wireless communicative connection among the group G2 and the wireless communicative connection among the group G4 do not interfere with each other. Therefore, the wireless communicative connections of the groups G1, G2 and G4 may co-exist at the same time. However, the disclosure is not limited to that three groups G1, G2 and G4 must co-exist at the same time. In another embodiment, the wireless communicative connections of any two groups (e.g., the groups G1 and G2, or the groups G1 and G4, or the groups G2 and G4) may co-exist.

In the embodiment, the wireless communicative connections can be formed by the wireless communication unit 140 on each device 101~108. Ire the embodiment, the wireless communication unit 140 can be a proximity wireless communication unit for forming the wireless communicative connection. The wireless communicative connection is formed based on a protocol selected from the group consisting of, but not limited to, Bluetooth (BT), Wireless Fidelity (WiFi), WiFi direct, Zigbee, Near Field Communication (NFC) and Infrared Communication.

In this case, the devices in the same group may share data, information or files stored in their storage unit 180. The data, information or files exchanged in one group will not be overheard by devices in other groups.

It is noted that, each device is not limited within a fixed group. In this disclosure, the devices 101~108 can be grouped. Reference is also made to FIG. 2B, which is a schematic diagram illustrating another connective relationship among devices 101~108 according to the embodiment of the disclosure. If users of the devices 104 and 105 tend to exchange data with the device 103, users may move the devices 104 and 105 in the "2"-shaped pattern. In this case shown in FIG. 2B, the devices 104 and 105 now share the common motion pattern with the device 103, and the devices 104 and 105 are now re-grouped into the group G3. In other words, each device 101~108 may join different groups at different timings.

Figure 4:
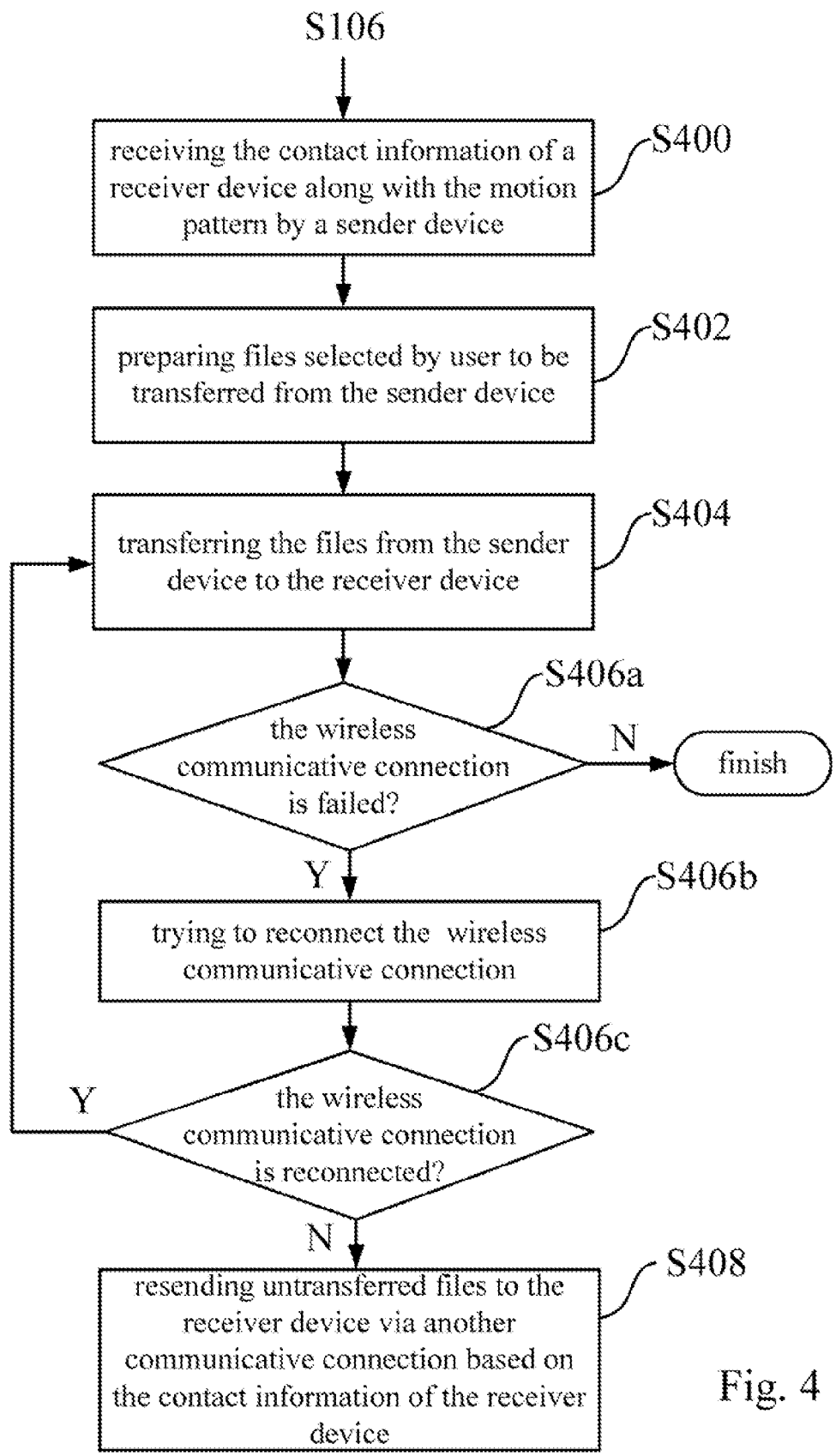
FIG. 4 is a flow chart illustrating the communicative connection method after the wireless communicative connections are formed according to an embodiment of the disclosure.

Reference is also made to FIG. 4, which is a flow chart illustrating the communicative connection method after the wireless communicative connections are formed according to an embodiment of the disclosure. Based on aforesaid embodiment shown in FIG. 1, the communicative connection method further includes steps (S400~S408 in FIG. 4) after the wireless communicative connections are formed (S106 in FIG. 1) among a group (e g., G1, G2 or G4 in FIG. 2A) including at least two devices. The group of devices includes a sender device and a receiver device in the embodiment of FIG. 4.

It is noted that each device in the group can be the sender device and also receiver device alternatively according to practical demanding. The sender device and the receiver device are named for better understanding, and each device is not limited to either the sender device or the receiver device only.

In the embodiment, contact information of each device can be broadcasted along with the motion pattern of each device (referring to S102 in FIG. 1). The contact information can be phone number, e-mail address, SMS identification, social network identification or any equivalent contact information of each device.

As shown in FIG. 4, after a wireless communicative connection is formed among a group (e.g., G1, G2 or G4 in FIG. 2A), step S400 is executed for receiving the contact information of the receiver device along with the motion pattern by the sender device. Step S402 is executed for preparing files selected by user to be transferred from the sender device. Step S404 is executed for transferring the files from the sender device to the receiver device.

While the files are transferring to the receiver device, step S406a is executed for determining whether the wireless communicative connection is failed. If the wireless communicative connection is not failed, the files transmission can be complete successfully. On the other hand, if an error occurs to the wireless communicative connection (i.e., the wireless communicative connection is failed), step S406b is executed for trying to reconnect the wireless communicative connection. Step S406c is executed for determining whether the wireless communicative connection is reconnected.

If the wireless communicative connection is reconnected, it may return to step S404 for resuming the transmission. On the other hand, if attempts of reconnecting are failed (e.g., a total idle time without connection exceeds a threshold timeout, or a user decides to stop reconnecting), step S408 is executed for resending untransferred files to the receiver device via another communicative connection based on the contact information of the receiver device. The untransferred files can be sent to the receiver device via text-message, email, SMS message, Instant-Message (IM) software, or social network message based on the contact information (e.g., phone number, e-mail address, SMS identification, social network identification, etc.) of the receiver device. Or in another embodiment, the untransferred files can be recorded and sent at the next time when the same wireless communicative connection (to the same receiver device) is established.

Figure 5:
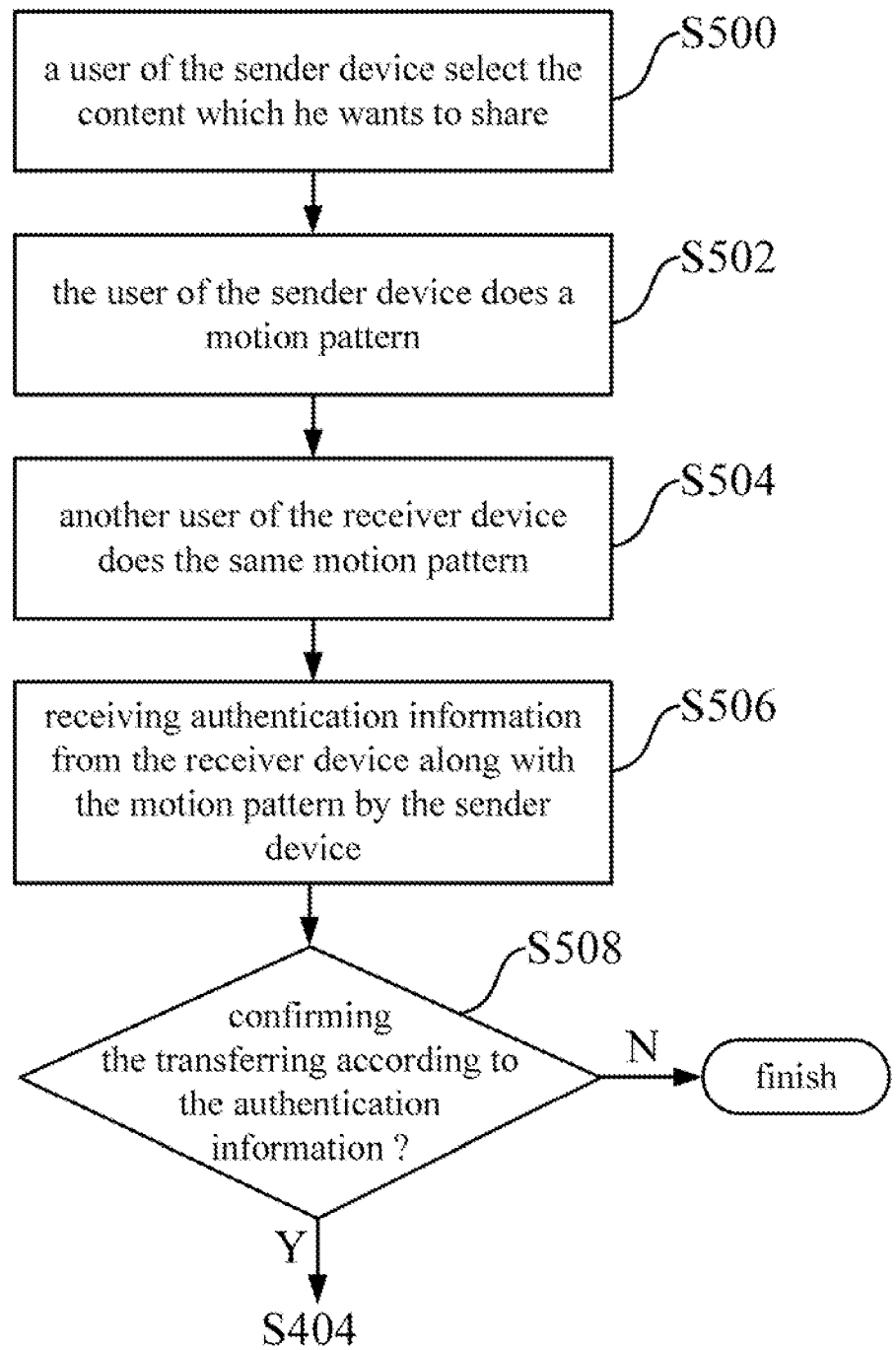
FIG. 5 is a flow chart illustrating an operational example according to an embodiment of the disclosure.

Reference is also made to FIG. 5, which is a flow chart illustrating an operational example according to an embodiment of the disclosure. In step S500 of the operational example shown in FIG. 5, a user of the sender device may select the contents (e.g., certain files in the storage unit 180) he wants to share. In step S502, the user of the sender device may do a specific motion pattern. In response, another user of the sender device must do the same motion pattern as the one of the sender device in step S504.

In an embodiment of the disclosure, authentication information of each device can be broadcasted along with the motion pattern of each device (referring to S102 in FIG. 1). The authentication information can be user profile information including a phone number, a picture, a profession, an address, a company name of the user of each device.

In the embodiment, step S506 is executed for receiving the authentication information from the receiver device along with the motion pattern by the sender device.

Afterward, the authentication information of the receiver device can be display on the sender device. Step S508 is executed for confirming the transferring according to the authentication information. For example, the user of the sender device may see a picture or phone number of receiver and decide whether it is the right target to transfer. In another example, the authentication information can be automatically confirmed on the sender device by checking whether the authentication information exists in a database of the sender device. For example, the authentication information can be the phone number or the address of the receiver; the database can be the sender's contact database (including phone numbers, addresses, emails, etc); and, the confirming operation can be performed by matching the phone number/address of the receiver with all contacts in the sender's contact database.

If the transferring is confirmed by the user of the sender device e.g. the phone number of the receiver exists in the sender's contact database already, and it implies that the sender and the receiver know each other), it may go to step S404 (as shown in FIG. 4) for transferring the files from the sender device to the receiver device.

Figure 6:
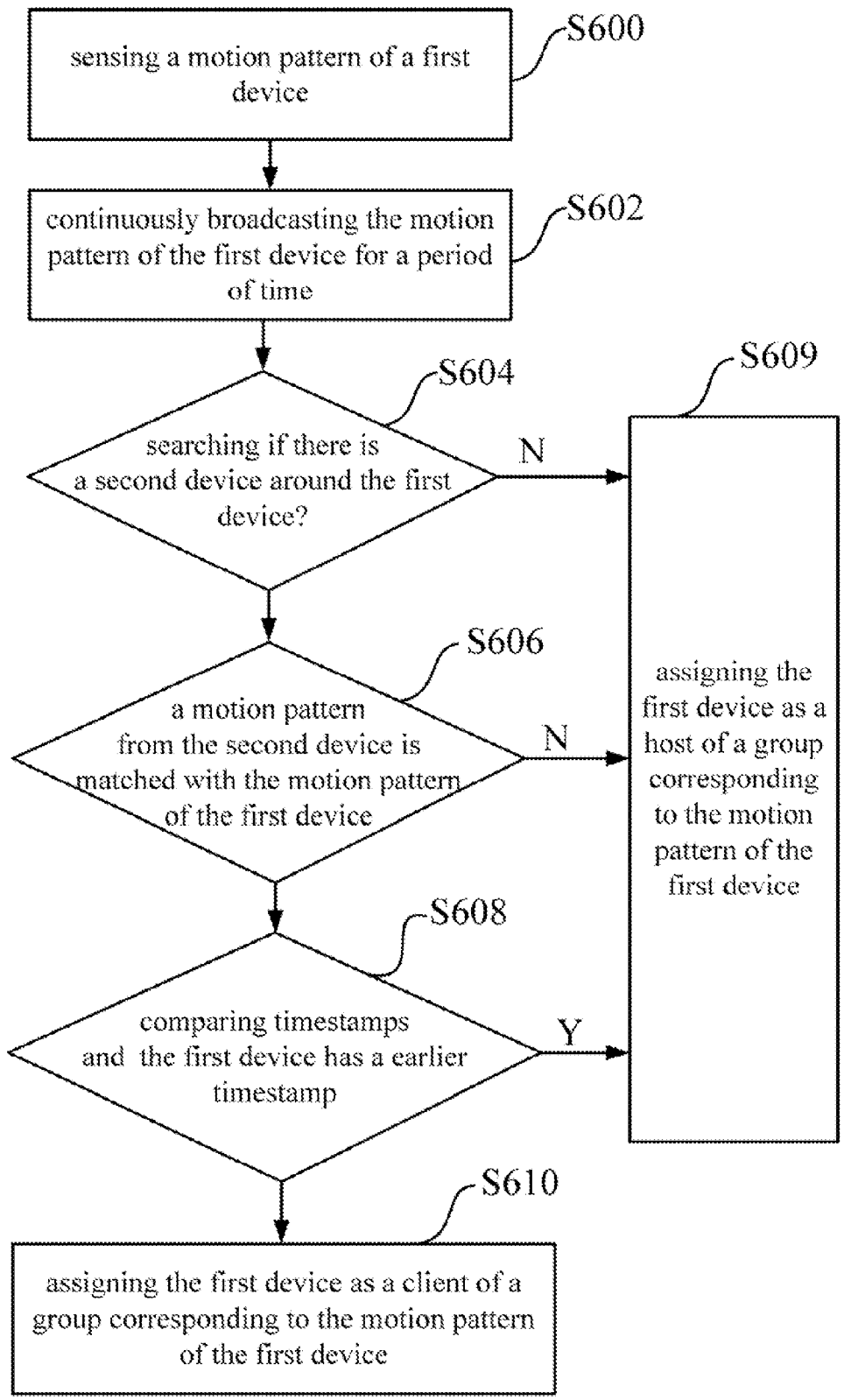
FIG. 6 is a flow chart illustrating a communicative connection method suitable for a first device among other devices among devices according to an embodiment of the disclosure.

Reference is also made to FIG. 6. FIG. 6 is a flow chart illustrating a communicative connection method suitable for a first device among other devices among devices according to an embodiment of the disclosure. FIG. 6 further demonstrates how the communicative connection method is operated on one device and how to assign a host and a client in a group of multiple devices described in aforesaid embodiments wherein the host and the client (also known as master and slave) represent the roles required by protocol standard for forming the wireless communicative connection such as aforesaid Bluetooth (BT), Wireless Fidelity (WiFi), WiFi direct and etc.

Step S600 is executed for sensing a motion pattern of the first device e.g., by the motion sensor 120 shown in FIG. 3).

Step S602 is executed for continuously broadcasting the motion pattern of the first device for a period of time. In this case, a timestamp of the first device is broadcasted along with the motion pattern. The timestamp corresponds to when the motion pattern is sensed.

Step S604 is executed for searching if there is a second device of the other devices around the first device. It is noted that the first device can be one of devices 101~108 described in aforesaid embodiments, and the second device can be another one of devices 101~108 described in aforesaid embodiments.

When no other device is found around the first device in step S604, then the first device is assigned as a host of a group corresponding to the motion pattern of the first device in Step 609.

If the second device is found around the first device, then Step S606 is executed for comparing another motion pattern from the second device with the motion pattern of the first device.

When no motion pattern from other devices is matched with the motion pattern of the first device in step S606, then the first device is assigned as a host of a group corresponding to the motion pattern of the first device by step S609. For example, the device 103 is assigned as the host of the group G3 in FIG. 2A; and, the device 102 is assigned as the host of the group G2 in FIG. 2 6.

If there is at least one second device(s) has the same motion pattern matched with the motion pattern of the first device, step S608 is executed for comparing the timestamp(s) from the second device(s) with the timestamp of the first device. For example, the groups G1, G2 and G4 in FIG. 2A need to compare the timestamps from devices.

When the timestamp of the first device is earlier than the timestamp(s) from the second device(s), the first device is assigned as a host of a group corresponding to the motion pattern of the first device by step S609. As shown in FIG. 2A, the device 101, the device 104 and the device 108 are assumed to have the earliest in their own group G1, G2 or G4, such that the device 101, the device 104 and the device 108 are assigned to be hosts for groups G1, G2 and G4.

On the other hand, when the timestamp of the first device is later than one timestamp from the second device(s), step S610 is executed for assigning the first device as a client of a group corresponding to the motion pattern. As shown in FIG. 2A, the device 101 is assumed to have the earliest in the group G1, such that the device 106 is assigned to be a client in the group G1.

Afterward, the communicative connection method further execute a step (not shown in FIG. 6) of forming a wireless communicative connection among the first device and the second device with the matched motion pattern. For example, the wireless communicative connection is formed among devices within the group G1, the group G2 or the group G4 shown in FIG. 2A.

Based on aforesaid embodiments of the communicative connection method, the devices in the same area can separated in different groups by distinct motion patterns, such that the devices in the same group may securely send/receive/exchange data among each others. The data shared between devices in one group will not be leaked to devices outside the group. In addition, the communicative connection method also includes a user authentication procedure and a function of re-sending data via other communicative tools, so as to provide better security in the data exchanging among devices.

It will be apparent to those skilled in the art that various modifications and variations can be made to the structure of the present application without departing from the scope or spirit of the application. In view of the foregoing, it is intended that the present application cover modifications and variations of this application provided they fall within the scope of the following claims.

What is claimed is:

1. A communicative connection method among multiple devices, comprising:
sensing a motion pattern on each of the devices;

retrieving an authentication information in at least one of the multiple devices, wherein the authentication information associates with a user profile information;

broadcasting the motion pattern and the authentication information;

receiving the motion pattern and the authentication information;

automatically comparing the motion patterns from the devices and checking the authentication information from the at least one of devices; and forming a first wireless communicative connection among a group of at least two devices in response to the at least two devices sharing one common motion pattern and the authentication information existing in a database;

wherein contact information and authentication information of each device is broadcasted along with the motion pattern of each device;

wherein after forming the first wireless communicative connection is formed among the group of devices, the group of devices comprises a sender device and a receiver device, the communicative method further comprises:

receiving the contact information of the receiver device along with the motion pattern by the sender device;

preparing files selected to be transferred from the sender device;

transferring the files from the sender device to the receiver device; and if the first wireless communicative connection is failed; resending untransferred files to the receiver device via another communicative connection, wherein said another communicative connection is different from the first wireless communicative connection and is established based on the contact information of the receiver device.

2. The communicative connection method of claim 1, further comprising:

forming a second wireless communicative connection among another group of at least two devices sharing another common motion pattern, the second wireless communicative connection co-existing with the first wireless communicative connection.

3. The communicative connection method of claim 1, further comprising:

converting the motion patterns on the devices into distinct motion codes representing different motion patterns, wherein the distinct motion codes are utilized to be broadcasted and compared.

4. The communicative connection method of claim 1, wherein a timestamp is broadcasted along with the motion pattern on each of the device, the timestamp corresponds to when the motion pattern is sensed.

5. The communicative connection method of claim 4, wherein, among the devices sharing one common motion pattern, one device with the earliest timestamp is assigned to be a host of the group, and other devices are assigned to be clients of the group.

6. The communicative connection method of claim 1, wherein the communicative connection method further comprises:

receiving the authentication information from the receiver device along with the motion pattern by the sender device; and selectively transferring the files from the sender device to the receiver device according to the authentication information from the receiver device.

7. The communicative connection method of claim 6, wherein the step of selectively transferring the files from the sender device to the receiver device according to the authentication information further comprises:

automatically confirming the authentication information on the sender device by checking whether the authentication information exists in a database of the sender device.

8. The communicative connection method of claim 1, wherein each of the devices comprises a motion sensor for sensing the motion pattern, the motion sensor is selected from the group consisting of a gravity sensor (G-sensor), compass sensor and a gyroscope sensor (Gyro sensor).

9. The communicative connection method of claim 1, wherein each of the devices comprises a proximity wireless communication unit for forming the wireless communicative connection, the wireless communicative connection is formed based on a protocol selected from the group consisting of Bluetooth (BT), Wireless Fidelity (WiFi), WiFi direct, Zigbee, Near Field Communication (NFC) and Infrared Communication.

10. The communicative connection method of claim 1, wherein the first wireless communicative connection is based on a proximity wireless communication protocol, and said another communicative connection between the sender device and the receiver device is realized over a cell phone network or the Internet.

11. A communicative connection method, suitable for a first device among other devices, the communicative connection method comprising:

sensing a motion pattern of the first device;

retrieving an authentication information in the first device, wherein the authentication information associates with a user profile information;

broadcasting the motion pattern of the first device and the authentication information;

receiving the motion pattern and the authentication information;

searching if there is a second device of the other devices around the first device;

automatically comparing another motion pattern from the second device and checking the authentication information from the first device with the motion pattern of the first device if the second device is found around the first device; and forming a first wireless communicative connection among the first device and the second device if the motion patterns are matched and the authentication information exist in a database;

wherein contact information and authentication information of the first device is broadcasted along with the motion pattern of each device;

wherein after forming the first wireless communicative connection is formed among the first device and the second device, the communicative method further comprises:

receiving the contact information of the second device along with the motion pattern by the first device;

preparing files selected to be transferred from the first device;

transferring the files from the first device to the second device; and if the first wireless communicative connection is failed, resending untransferred files to the second device via another communicative connection, wherein said another communicative connection is different from the first wireless communicative connection and is established based on the contact information of the second device.

12. The communicative connection method of claim 11, wherein, if no device is found around the first device, the communicative connection method comprises:
assigning the first device as a host of a group corresponding to the motion pattern of the first device.

13. The communicative connection method of claim 11, wherein, if the motion pattern from the second device is not matched with the motion pattern of the first device, the communicative connection method further comprises:
assigning the first device as a host of a group corresponding to the motion pattern: of the first device.

14. The communicative connection method of claim 11, wherein a timestamp is broadcasted along with the motion pattern on each of the first device and the second device, the timestamp corresponds to when the motion pattern is sensed, when, the communicative connection method further comprises:
comparing the timestamp from the second device with the timestamp of the first device if the motion pattern from the second device is matched with the motion pattern of the first device;
assigning the first device as a host of a group corresponding to the motion pattern if the timestamp of the first device is earlier than the timestamp from the second device; and
assigning the first device as a client of a group corresponding to the motion pattern if the timestamp of the first device is later than the timestamp from the second device.

15. The communicative connection method of claim 11, further comprising:
converting the motion pattern on the first device into a distinct motion code corresponding to different motion patterns, wherein the distinct motion code is utilized to be broadcasted and compared.

16. The communicative connection method of claim 11, wherein the first device comprises a motion sensor for sensing the motion pattern, the motion sensor is selected from the group consisting of a gravity sensor (G-sensor), compass sensor and a gyroscope sensor (Gyro sensor).

17. The communicative connection method of claim 11, wherein the first device comprises a proximity wireless communication unit for forming the wireless communicative connection, the wireless communicative connection is formed based on a protocol selected from the group consisting of Bluetooth (BT), Wireless Fidelity (WiFi), WiFi direct, Zigbee, Near Field Communication (NEC) and Infrared Communication.

* * * * *